United States Patent
Yang et al.

(10) Patent No.: US 11,090,686 B2
(45) Date of Patent: Aug. 17, 2021

(54) METHOD FOR COATING BORON

(71) Applicants: NUCTECH COMPANY LIMITED, Beijing (CN); TSINGHUA UNIVERSITY, Beijing (CN)

(72) Inventors: Yigang Yang, Beijing (CN); Zhujun Fang, Beijing (CN); Yulan Li, Beijing (CN)

( * ) Notice: Subject to any disclaimer, the term of this patent is extended or adjusted under 35 U.S.C. 154(b) by 263 days.

(21) Appl. No.: 16/403,606

(22) Filed: May 5, 2019

(65) Prior Publication Data
US 2019/0344308 A1 Nov. 14, 2019

(30) Foreign Application Priority Data
May 9, 2018 (CN) .......................... 201810437224.7

(51) Int. Cl.
| | | |
|---|---|---|
| *B05D 7/00* | (2006.01) | |
| *C09D 163/00* | (2006.01) | |
| *G01T 3/08* | (2006.01) | |
| *B05D 7/14* | (2006.01) | |
| *B05D 7/02* | (2006.01) | |
| *B05D 5/12* | (2006.01) | |
| *B05D 1/18* | (2006.01) | |
| *B05D 1/02* | (2006.01) | |
| *B05D 1/28* | (2006.01) | |
| *C09D 5/03* | (2006.01) | |
| *C09D 1/00* | (2006.01) | |
| *C08G 59/24* | (2006.01) | |
| *C08G 59/50* | (2006.01) | |
| *B05D 3/02* | (2006.01) | |

(52) U.S. Cl.
CPC ................ *B05D 7/51* (2013.01); *B05D 1/02* (2013.01); *B05D 1/18* (2013.01); *B05D 1/28* (2013.01); *B05D 5/12* (2013.01); *B05D 7/02* (2013.01); *B05D 7/14* (2013.01); *C09D 1/00* (2013.01); *C09D 5/031* (2013.01); *C09D 163/00* (2013.01); *G01T 3/08* (2013.01); *B05D 3/0209* (2013.01); *B05D 2202/25* (2013.01); *B05D 2202/45* (2013.01); *B05D 2203/22* (2013.01); *B05D 2350/60* (2013.01); *B05D 2504/00* (2013.01); *C08G 59/245* (2013.01); *C08G 59/5006* (2013.01)

(58) Field of Classification Search
None
See application file for complete search history.

(56) References Cited

U.S. PATENT DOCUMENTS

| | | | | |
|---|---|---|---|---|
| 3,133,807 | A * | 5/1964 | Denman ............... | C03B 9/3875 65/356 |
| 4,760,252 | A * | 7/1988 | Albats ..................... | G01V 5/04 250/266 |
| 2013/0062531 | A1* | 3/2013 | Lustig ..................... | G01T 3/008 250/392 |
| 2014/0312536 | A1* | 10/2014 | Kim ......................... | C08K 9/04 264/442 |

FOREIGN PATENT DOCUMENTS

| CN | 103995280 A | 8/2014 |
|---|---|---|
| CN | 106199681 A | 12/2016 |

OTHER PUBLICATIONS

Research on a Neutron Detector with a Boron-Lined Honeycomb Neutron Converter.

* cited by examiner

*Primary Examiner* — Christopher M Rodd
(74) *Attorney, Agent, or Firm* — Kilpatrick Townsend & Stockton, LLP

(57) ABSTRACT

The present application relates to a method for coating boron, to a boron-containing resin solution, to a boron-coated thermal neutron converter obtained by the method for coating boron, and further to a thermal neutron detector comprising the boron-coated thermal neutron converter. The method for coating boron as provided in the application is applicable for various substrates and has small restrictions on substrate shapes, particularly for substrates having complex surface structures and high aspect ratios.

19 Claims, 3 Drawing Sheets

METHOD FOR COATING BORON

The present application is based on and claims the benefit of priority from Chinese application No. 201810437224.7, filed May 9, 2018, the disclosures of which are incorporated herein by reference in its entirety.

FIELD

The present application belongs to the technical field of neutron detection, and particularly, it relates to a method for coating boron, to a boron-containing resin solution, to a boron-coated thermal neutron converter obtained by the method for coating boron, and to a thermal neutron detector comprising the boron-coated thermal neutron converter.

BACKGROUND

With gradual increases of applications of neutron detection and imagining technique in many fields, such as homeland security, material monitoring, and neutron scattering source measurement, the demand for neutron detectors is also gradually increasing. However, $^3$He gas widely used has not been able to meet growing demands for use. Different types of new neutron detectors have been developed to replace $^3$He, including a gas neutron detector, a scintillator neutron detector, a semiconductor neutron detector, etc. Among them, a boron-coated gas neutron detector is a valued research point.

There is no charge in a neutron itself. Except for a few of neutron sensitive nuclides such as $^6$Li, $^{10}$B, Gd, the neutrons have small reaction cross-sections with other substances, which will result in an intuitive effect that the neutrons are difficult to be directly detected. The working basis of a boron-coated gas neutron detector is a thermal neutron converter containing $^{10}$B nuclides. The $^{10}$B nuclides have a high sensitivity to thermal neutrons. The thermal neutrons will react with the $^{10}$B nuclides by a nuclei reaction to produce charged particles, and the charged particles, when moving in a gas, will result in the gas ionization. By measuring the quantity of the gas ionization, the level of the neutron fluence rate is determined. In such a kind of detectors, the thermal neutron converter is usually constituted with a solid substrate having a specified structure that is adhered by a micrometer-sized boron-containing material on its surface.

Methods for coating a boron-containing material on a solid substrate surface include electrophoresis, physical vapor deposition (PVD), chemical vapor deposition (CVD), etc.

In a physical vapor deposition (PVD) method for coating boron based on a technique such as sputtering coating, with a material such as a planar aluminum or copper sheet as a substrate and a material such as $B_4C$ or B as a target material, an electron beam or an ion beam is utilized to bombard the target material so that the neutral target atoms or molecules are deposited on the substrate to form a thin film. In an electrophoresis-based method for coating boron on a metal substrate, with a conductive metal substrate as the cathode, an electrical field is applied so that boron-containing substance particles suspended in an electrophoresis solution migrate directionally and deposit on the surface of the substrate to form a thin film. In order to ensure the homogeneity of film formation, the above two methods usually use substrates having planar surfaces or substrates having simple folded surface structures, whereas they are not applicable for substrates with complex structure, such as substrates having complex surface structures with a high aspect ratio or deep holes.

In a chemical vapor deposition (CVD) method for coating boron based on a technique such as atomic layer deposition (ALD), two or more gaseous chemical materials are used to fill a space in which a substrate is placed one by one, and through some chemical reactions, boron-containing compounds are produced and adhered onto a substrate. One reaction cycle will form a layer of thin film having an atomic thickness, and by repeating the reaction cycle tens of thousands times even hundreds of thousands of times, a micrometer-sized boron-containing coating layer will be formed. This method is applicable for coating a film on a substrate having a complex surface structure or a substrate having a high aspect ratio. However, the method has a low utilization rate of raw materials and requires a long working time.

SUMMARY

The present application relates to a boron-containing resin solution, comprising a solute and a solvent, wherein the solute comprises boron power, a resin and a curing agent.

The boron-containing resin solution as provided by the application can adhere nanometer-sized boron powder particles onto an internal surfaces and/or an external surfaces of a variety of metallic substrates or non-metallic insulating substrates, to form a micrometer-sized boron-containing coating layer.

In order to ensure the $^{10}$B content in the final formed boron-containing coating layer as high as possible, the solute components (i.e., the resin and the curing agent) except for the boron powder should be reduced as far as possible. However, boron powder, with the help of a cured resin, forms a chain structure so as to adhere onto the surface of a substrate. The inventor finds out that the proportion of the resin and curing agent together cannot be too low, and a too low proportion will result in easy falling-off of a boron-containing coating from the surface of the substrate. In some embodiments, in the boron-containing resin solution of the present application, the ratio of the total weight of the resin and the curing agent to the weight of the boron powder in the solute is preferably from 1:2 to 1:20, further preferably from 1:5 to 1:15, and more further preferably from 1:8 to 1:10, such as about 1:9.

In some embodiments, in the boron-containing resin solution of the present application, the weight ratio of the solute (the total weight of the resin, the curing agent and the boron powder) to the solvent is preferably from 1:1 to 1:20, further preferably from 1:1 to 1:15, more preferably from 1:2 to 1:10, and most preferably from 1:4 to 1:6, such as about 1:5. The inventor finds out that the ratio of the solute (i.e., the resin, the curing agent and the boron powder) to the solvent can produce impacts on the amount of the boron powder that is in contact with or deposited onto the surface of the substrate, and in order to ensure the homogeneous formation of the micrometer-sized boron layer, the concentration of the solution should be kept in a suitable range. A too high concentration will influence the application thickness while a too low concentration will influence the application efficiency. The above ratio of the solute to the solvent of the present application can achieve applying of a small quantity of boron once but many times, so as to reach a good balance between the applying efficiency and the thickness control.

In some embodiments, in the boron-containing resin solution of the present application, the weight ratio of the curing agent to the resin in the solute is from 1:3 to 1:5 (for example, about 1:4).

In some embodiments, in the boron-containing resin solution of the present application, the weight ratio of the boron powder, the resin, and the curing agent in the solute is about 45:4:1.

In some embodiments, in the boron-containing resin solution of the present application, the weight ratio of the boron powder, the resin, the curing agent, and the solvent is 45:4:1:250.

The present application further relates to a method for coating boron, comprising the following steps:

1) applying the boron-containing resin solution of the present application on an internal surface and/or an external surface of a substrate;

2) removing the solvent in the boron-containing resin solution and hardening the resin, to form a boron-containing coating layer on the surface of the substrate.

If necessary, the step 1) and the step 2) may be repeated many times, for example, from 2 to 4 times, until the thickness of the boron-containing coating layer can meet desired requirements. The boron-containing coating layer preferably has a thickness from 0.1 to 6 μm, and further preferably from 0.8 to 4 μm.

In some embodiments, the method for coating boron of the present application further comprises a pretreatment step prior to the step 1), and the pre-treatment is to form a resin layer on the internal surface and/or external surface of the substrate. Preferably, the resin layer has a thickness from 2 to 4 μm.

The pretreatment can form a resin layer on the internal surface and/or external surface of the substrate so that the surface of the substrate is smooth and dense, thereby much convenient to boron applications.

In some embodiments, in the method for coating boron of the present application, the pretreatment step comprises the following steps:

a) weighing a resin, a curing agent and a solvent, and mixing them well to produce a resin solution;

b) applying the resin solution on the internal surface and/or external surface of the substrate;

c) removing the solvent in the resin solution and hardening the resin to form a resin layer on the surface of the substrate;

wherein the ratio of the total weight of the resin and curing agent to the weight of the solvent is from 1:2 to 1:6 (for example, about 1:3), the weight ratio of the curing agent to the resin is preferably from 1:3 to 1:5 (for example, about 1:4), the weight ratio of the resin, the curing agent and the solvent is preferably about 4:1:16.

If necessary, the pretreatment step may be repeated many times, for example 2 to 4 times, until the thickness of the resin layer can meet desired requirements. Preferably, the thickness of the resin layer is from 2 to 4 μm.

In some embodiments, in the step 1) or the step b) of the method for coating boron of the present application, the boron-containing resin solution or the resin solution is applied on the surface of the substrate by the means of brush coating, spray coating or dipping coating.

In some embodiments, in the step 2) or the step c) of the method for coating boron of the present application, a method of removing the solvent is to volatilize the solvent in the boron-containing resin solution or in the resin solution by the means of baking.

The present application further relates to a method for making a boron-coated thermal neutron converter, comprising the following steps:

1) preparing a substrate:

2) adhering a boron-containing coating layer on an internal surface and/or an external surface of the substrate using any of the methods for coating boron of the present application.

The present application further relates to a boron-coated thermal neutron converter obtained according to the method for making a boron-coated thermal neutron converter of the present application.

In some embodiments, the boron-coated thermal neutron converter of the present application comprises:
a substrate, and
a boron-containing coating layer applied on the internal surface and/or external surface of the substrate.

In some embodiments, the boron-coated thermal neutron converter of the present application comprises:
a substrate,
a resin layer applied on the internal surface and/or external surface of the substrate, and
a boron-containing coating layer applied on the resin layer.

In some embodiments, in the boron-coated thermal neutron converter of the present application, the weight ratio of the boron to the resin in the boron-containing coating layer is from 2:1 to 20:1, preferably from 5:1 to 15:1, and more preferably from 8:1 to 10:1, for example, about 9:1.

In some embodiments, in the boron-coated thermal neutron converter of the present applicant, the boron-containing coating layer has a thickness from 0.1 to 6 μm, and preferably from 0.8 to 4 μm, for example, from 1 to 2.5 μm, such as about 1.2 μm, about 1.5 μm, about 2 μm or about 3.5 μm.

In some embodiments, in the boron-coated thermal neutron converter of the present applicant, the resin layer has a thickness from 2 to 4 μm, for example, 3.0 μm.

The present application further relates to a thermal neutron detector, comprising any of the boron-coated thermal neutron converters of the present application.

In some embodiments, the boron power of the present application is a nanometer-sized boron powder, including, but not being limited to, nanometer single-substance boron powder and nanometer boron carbide ($B_4C$) powder. The boron powder of the present application may be either economic natural boron powder or purified boron powder having high performance.

The average molecular weight of a resin will influence the fastening performance of the chain structure formed therefrom, and thus in the present application, a resin having low molecular weight and resisting high temperature is selected. In some embodiments, the resin of the present application are a resin having molecular weight from 200 to 500, preferably epoxy resin having molecular weight from 200 to 500, such as bisphenol A epoxy resin, EPOLAM 2040, bisphenol F epoxy resin, and novolac epoxy type vinyl ester resin, and further preferably bisphenol A epoxy resin.

In the present application, the curing agent cooperates with the resin to take a curing reaction. According to the kind of the resin, suitable kinds of the curing agent are selected. The kinds of curing agents capable of causing the curing of bisphenol A epoxy resin primarily include polyamines and polyacids, such as ethylenediamine, triethylamine, diethylenetriamine, triethylenetetramine, N,N-dimethylaminopropylamine, N,N-diethylaminopropylamine, xylenediamine, m-phenylenediamine, etc., and the preferred curing agent is triethylenetetramine.

In the present applications, the solvent may be a solvent having boiling point between 100° C. and 200° C., and the preferred solvent is a reactive diluent suitable for epoxy resin, for example, such as butyl glycidyl ether, benzyl glycidyl ether, phenyl glycidyl ether, ethylene glycol diglycidyl ether, alkylene glycidyl ether, etc. The preferred solvent is 501 diluent (a butyl glycidyl ether).

In some embodiments, in the method for coating boron of the present application, the resin is a bisphenol A epoxy resin, the curing agent is triethylenetetramine, and the solvent is 501 diluent.

In the present application, the substrate may be a metallic substrate or non-metallic insulating substrate, including a substrate of various materials such as aluminum, copper, Aramid paper, and a preferred substrate is an Aramid paper honeycomb or an aluminum substrate, particularly an Aramid paper honeycomb having an aspect ratio of from 5:1 to 60:1, for example, an Aramid paper honeycomb having an aspect ratio of from 10:1 to 50:1, Aramid paper honeycomb having an aspect ratio of from 20:1 to 40:1, and Aramid paper honeycomb having an aspect ratio of 30:1.

In the present application, the term "about" shall be understood as a values which are within ±10%, ±9%, ±8%, ±7%, ±6%, ±5%, ±4%, ±3%, ±2%, ±1%, ±0.5%, ±0.1%, ±0.05% or ±0.01% of the designated value.

In the present application, the term "and/or", e.g., "internal surface and/or external surface" shall be understood to mean either "internal surface and external surface" or "internal surface or external surface" and shall be taken to provide explicit support for both meanings or for either meaning.

In the present application, the dipping coating is a method in which a substrate is fully dipped into a solution (for example, the resin solution or the boron-containing resin solution), soaked, and then taken out of the solution, a coating layer of the solution will be formed on the surface of the substrate.

In the present application, the spray coating is a method in which a solution (for example, the resin solution or the boron-containing resin solution) is extruded or suctioned from a container by external force and formed into a mist spray so that it can be adhered onto the surface of the substrate, thereby to form a coating layer of the solution.

In the present application, the brush coating is a method in which various paint brushes and broad brushes comprising a row of pen-shaped brushes are utilized to take a solution (for example, the resin solution or the boron-containing resin solution) and apply it on the surface of a substrate, thereby to form a coating layer of the solution.

In the present application, the "internal surface" or "external surface" has the well-known meanings in the art. Generally, the "internal surface" refers to the inside surface of the substrate, and the "external surface" refers to the outside surface of the substrate.

In the method for coating boron of the present application, a resin layer may be first formed on an internal surface and/or an external surface of the substrate. The kind of the substrate is different, and thus the surface roughness thereof is also different. Thus, by pre-forming a resin layer on the surface of the substrate, surfaces of different substrates may be treated to be similar surfaces. Additionally, as compared to the boron-containing resin solution, the resin solution preferably contains higher concentrations of a resin and a curing agent, in this way, the substrate can be sufficiently soaked by the resin, and after baking treatment, the resin is cured to form a resin thin layer on the surface of the substrate which can enhance the fastening degree of the subsequent boron application.

In the method for coating boron of the present application, the baking as used is a way for quickly removing the solvent on the surface of the substrate, and it is necessary to set the baking temperature between the boiling point of the solvent and the boiling point of the solute.

Additionally, in order to ensure the homogenous boron application, the resin solution or the boron-containing resin solution may be applied many times and baked many times. Upon each baking, it is necessary to adjust the arrangement direction of the substrate according to the shape of the substrate to prevent one direction from facing down all the time, which will result in a too thick resin layer or boron-containing coating layer in some areas and a too thin resin layer or boron-containing coating layer in the other areas.

In general, during application, the homogeneity is primarily estimated by visions. When brown boron coating layers are sighted to cover on the pore inner walls of the honeycomb and at the corners thereof while no white Aramid paper substrate is sighted, it can be considered that the application is homogeneous. After the application, it is sampled at different positions and the samples are precisely measured with the thickness by an electronic microscope to evaluate the homogeneity of the coating in its entirety.

In addition, upon each application of the resin solution or the boron-containing resin solution, the substrate may be weighed and its weight may be recorded, and the weighing and recording can calibrate and control the coating boron process. By weighing the substrate before and after each application of the resin solution or boron-containing resin solution, the variation of the overall weight can be calculated, and thereby, the thickness of the resin layer or boron-containing coating layer formed on the substrate in this cycle can be estimated. By comparing the estimated thickness with a pre-determined increment of the thickness, the process progress can be controlled. Usually, the incremental thickness of the resin layer after each application is controlled between 1 μm and 2 μm, and the incremental thickness of the boron-containing coating layer after reach application is controlled between 0.2 μm and 0.5 μm. By weighing, the thickness of the coating layer is calculated and kept in an expected value so that the homogeneity may be ensured, and the thickness of the resin layer is controlled between 2 and 4 μm, and the thickness of the boron-containing coating layer is controlled between 0.1 and 6 μm.

In some embodiments, the method for coating boron of the application comprises the following steps:

a) preparing a substrate, cleaning its surface, and weighing and recording its weight;

b) weighing a resin, a curing agent and a solvent in a ratio to formulate a resin solution;

c) fully dipping the substrate in the resin solution and soaking it;

d) taking the substrate out, baking it in a baker after it is drained so that the resin is fully cured, and the solvent is fully volatilized, and after the temperature of the substrate is decreased to room temperature, weighing and recording its weight;

e) repeating the steps c) and d) until the thickness of the resin layer can meet desirable requirements, wherein in each repeating, weighing and recording are necessary;

f) weighing a nanometer-sized boron powder, a resin, a curing agent and a solvent in a ratio to formulate a boron-containing resin solution;

g) fully dipping the substrate coated with a resin layer in the boron-containing resin solution and soaking it;

h) taking the substrate out, baking it in a baker after it is drained so that the resin is fully cured, and the solvent is fully volatilized, and after the temperature of the substrate is decreased to room temperature, weighing and recording its weight;

i) repeating the steps g) and h) until the thickness of the boron-containing coating layer can meet desirable requirements.

The method for coating boron of the present application has one or more advantages of the following a) to d):

a) the method can utilize nanometer-sized boron powder particles to prepare a micrometer-sized boron-containing coating layer;

b) the method can adhere a micrometer-sized boron-containing coating layer on a variety of metallic substrates or non-metallic insulating substrates;

c) the method is applicable for various substrates and it has small restrictions on substrate shapes, particularly for substrates having complex surface structures and high aspect ratios;

d) the method can achieve a quick application of boron so that it can reduce the occupation time of the coating boron process, and thus it is suitable for streamlined and mass productions.

DETAILED DESCRIPTION OF THE INVENTION

Figure 1:
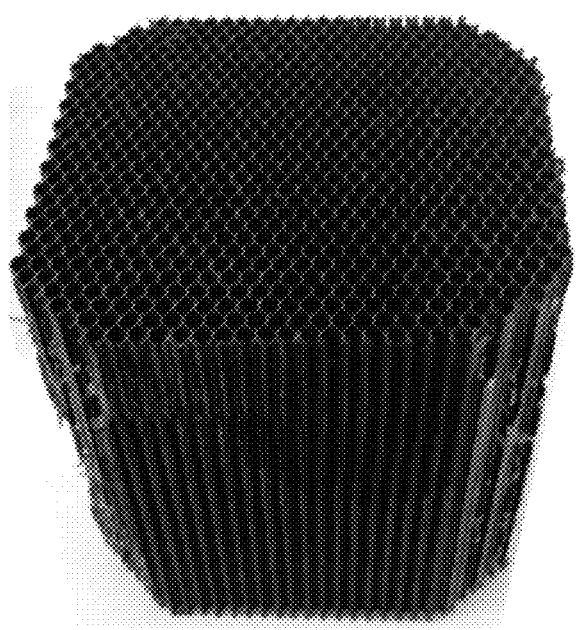
FIG. 1 shows a boron-coated sample obtained by using the method for coating boron of the application, with an Aramid paper honeycomb having a side length of 10 cm and an aspect ratio of 30:1 as the substrate.

The embodiments of the present application will be described in detail as below by combining the examples. However, a person skilled in the art could understand that the following examples are only used to illustrate, but not regarded to limit the scope of the present application. The examples whose specific conditions are not specified shall be carried out at conventional conditions or conditions recommended by the manufacturer. All materials whose manufacturers are not specified are conventional products that can be purchased from the market.

The materials and apparatus as used in the examples are introduced as follows:

1) Boron powder is nanometer-sized natural born powder, having an average particle size of 100 nm, commercially available from Hebei Zhongpuruituo Technology Co., Ltd.;

2) the substrate as used in Example 1 is an Aramid paper honeycomb having a side length of 1.83 mm, commercially available from Beijing Aoxing Boya Technology Development Co., Ltd., and the substrate as used in Example 2 is an aluminum sheet having a length of 100 mm, and a width of 50 mm;

3) The resin is a bisphenol A epoxy resin;

4) The solvent is 501 diluent (a butyl glycidyl ether);

5) The curing agent is triethylenetetramine;

6) The electronic microscope is Zeiss Auriga focal ion beam—field emission scanning electronic microscope from Carl Zeiss.

Example 1

In the present example, nanometer-sized boron powder particles were utilized to complete the boron application on an Aramid paper honeycomb substrate having an aspect ratio of 30:1, to prepare a novel thermal neutron converter.

The method for coating boron comprises the following steps:

i) A substrate was prepared, its surface was cleaned, and it was weighed and its weight was recorded.

ii) Applying a resin layer

According to the following formula, a suitable amount of a resin solution was prepared by mixing well the following ingredients:

resin:curing agent:solvent=250:62.5:1000 (weight ratio).

The substrate was fully dipped into the resin solution and soaked for 20 min. Then the substrate was taken out of the resin solution and slightly drained, and thereafter, it was baked in an 140° C. baker for 30 to 40 min until the resin was completely cured, and the solvent was completely volatilized.

After the temperature of the substrate was decreased to room temperature, it was weighted and its weight was recorded, and the increment of weight was found to be 3.9 g. By one application, the incremental thickness of the resin layer was about 1.5 μm.

The resin solution was applied repeatedly and the application was conducted twice, and in each application, weighing and recording were necessary. The resin layer had a total increment of 7.8034 g, and a thickness of about 3.084 μm.

iii) Applying a boron-containing coating layer

According to the following formula, a suitable amount of the boron-containing resin solution was prepared by mixing well the following ingredients:

nanometer-sized boron powder:resin:curing agent:solvent=180:16:4:1000 (weight ratio).

The following conditions were required: the ratio of the weight of boron powder to the total weight of the resin and the curing agent was about 9:1; the ratio of the weight of solute (i.e., the total weight of boron powder, resin and curing agent) to the weight of solvent was about 1:5.

The substrate coated with the resin layer on its surface was fully dipped into the boron-containing resin solution and soaked for 20 min.

The substrate was taken out, and after slightly draining, it was placed in a 140° C. baker and baked for 30 to 40 min so that the resin was completely cured and the solvent was completely voatilized.

The temperature of the substrate was decreased to room temperature, and after it was weighted and its weight was recorded, the increment of weight was 1.910 g.

The average mass thickness of boron coated on the surface of the honeycomb was calculated, and according to the expected value of the boron-containing coating layer from 0.8 to 4 μm, it was to be determined whether it was necessary to continue to apply the boron-containing resin solution. If necessary, the process of soaking-baking-weighing-calculating was repeated until the thickness and the homogeneity both can meet requirements. In case of the boron-containing resin solution formula in the present example, generally, the boron application should be conducted 4 to 5 times.

Figure 2:
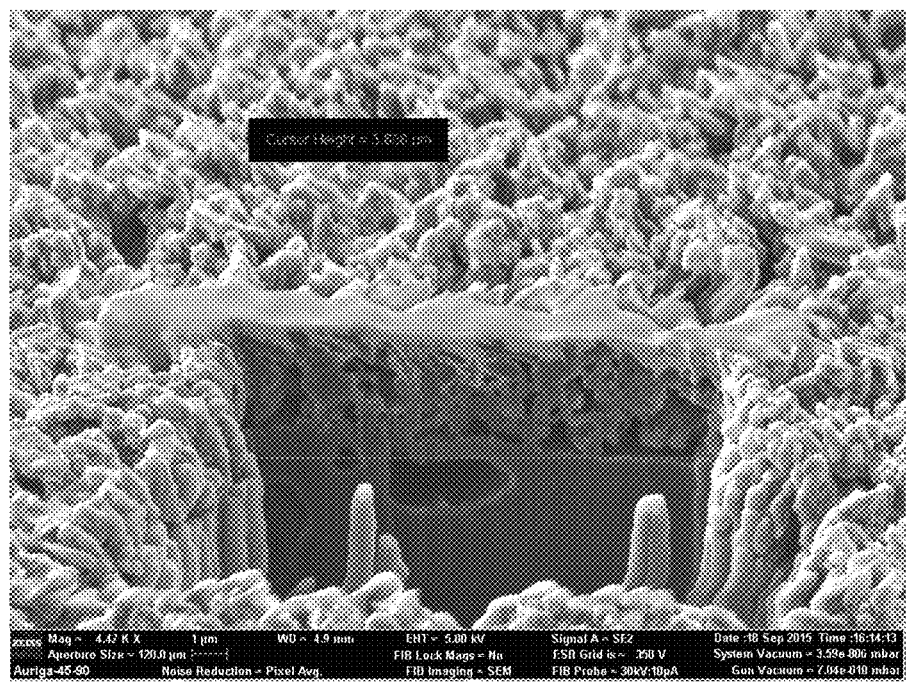
FIG. 2 shows a result of a boron-coated sample of Aramid paper honeycomb as observed by an electronic microscope, in which the thickness of the boron-containing coating layer is about 3.688 μm.

In this example, the boron-coated sample that was obtained by coating boron on the Aramid paper honeycomb having an aspect ratio of 30:1 was shown in FIG. 1. The fracture surface of the boron-containing coating layer was observed by an electron microscope, and as shown in FIG. 2, the thickness of the boron-containing coating layer was about 3.688 μm.

Example 2

In the present example, nanometer-sized boron powder particles were utilized to complete the boron application on an aluminum substrate having a length of 100 mm and a width of 50 mm, to prepare a novel thermal neutron converter. With experiments, it was demonstrated that when using an aluminum substrate to carry out the boron application, better surface effects can be achieved if a boron-containing coating layer was directly applied without application of a resin layer.

The method for coating boron comprises the following steps:
i) A substrate was prepared, its surface was cleaned, and it was weighed and its weight was recorded.
ii) Applying boron-containing coating layer According to the following formula, a suitable amount of the boron-containing resin solution was prepared by mixing well the following ingredients:
nanometer-sized boron powder:resin:curing agent:solvent=180:16:4:1000 (weight ratio)

The following conditions were required: the ratio of the weight of boron powder to the total weight of the resin and the curing agent was about 9:1; the ratio of the weight of solute (i.e., the total weight of boron powder, resin and curing agent) to the weight of solvent was about 1:5.

The substrate with the cleaned surface was fully dipped into the boron-containing resin solution and soaked for 20 min.

The substrate is taken out, and after slightly draining, it was placed in a 140° C. baker and baked for 30 to 40 min so that the resin was completely cured and the solvent was completely volatilized.

The temperature of the substrate was decreased to room temperature, and after it was weighted and its weight was recorded, the increment of weight was 0.0261 g.

The average mass thickness of boron coated on the surface of the aluminum sheet was calculated, and according to the expected value from 0.8 to 4 μm, it was to be determined whether it is necessary to continue to apply the boron-containing resin solution. If necessary, the process of soaking-baking-weighing-calculating was repeated until the thickness and the homogeneity both can meet requirements. In case of the boron-containing solution formula in the present example, generally, the boron application process should be conducted 2 to 4 times.

Figure 3:
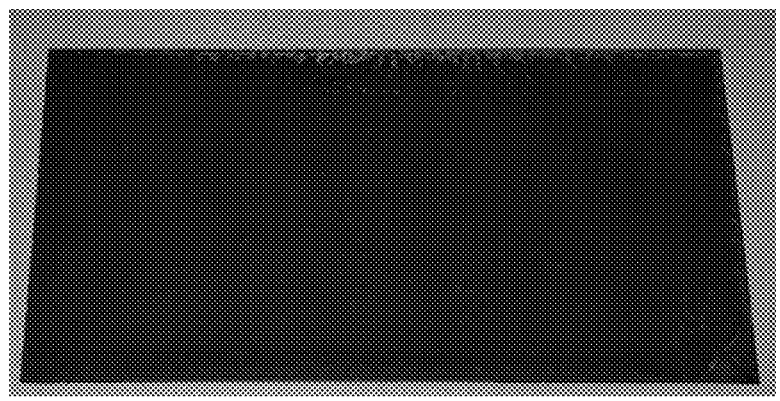
FIG. 3 is a sample obtained after applying boron on the surface of an aluminum substrate having a length 100 mm and a width of 50 mm by using the method for coating boron of the application.

In this present example, according to the above method, a boron-coated sample obtained after applying boron on the aluminum substrate having the length 100 mm and the width 50 mm was shown in FIG. 3. According to weight measurements, the thickness of the surface boron layer was calculated to be about 2.27 μm.

The method for coating boron of the application can utilize nanometer-sized boron powder particles to prepare a micrometer-sized boron-containing coating layer, and it is applicable for various substrates and it has small restrictions on substrate shapes, particularly for substrates having complex surface structures and high aspect ratios. The method can achieve quick application of boron so that it can reduce the occupation time of the coating boron process, and thus it is suitable for streamlined and mass productions. The method for coating boron not only can use economic natural boron powder, but also use purified boron powder having high performance as raw material, and thus it is widely applicable.

Although the specific embodiments of the present application have been described in detail, a person skilled in the art will understand that according to all the teachings that have been disclosed, various modifications and substitutions can be made to those details, all of which are within the protection scope of the application. The whole scope of the application is defined by the claims attached here and any equivalents thereof.

The invention claimed is:

1. A boron-containing resin solution comprising a solute and a solvent, the solute comprising boron powder, a resin and a curing agent, wherein the weight ratio of the solute to the solvent is from 1:1 to 1:20.

2. The boron-containing resin solution according to claim 1, wherein in the solute, the ratio of the total weight of the resin and curing agent to the weight of the boron powder is from 1:2 to 1:20.

3. The boron-containing resin solution according to claim 1, wherein in the solute, the weight ratio of the curing agent to the resin is from 1:3 to 1:5.

4. A method for coating boron, comprising the following steps:
   1) applying the boron-containing resin solution according to claim 1 on an internal surface and/or an external surface of a substrate;
   2) removing the solvent in the boron-containing resin solution and hardening the resin, to form a boron-containing coating layer on the surface of the substrate.

5. The method for coating boron according to claim 4, further comprising a pretreatment step prior to the step 1), wherein the pretreatment is to form a resin layer on the internal surface and/or external surface of the substrate.

6. The method for coating boron according to claim 5, wherein the pretreatment step comprises the following steps:
   a) weighing a resin, a curing agent and a solvent, and mixing them well to produce a resin solution;
   b) applying the resin solution on the internal surface and/or external surface of the substrate;
   c) removing the solvent in the resin solution and hardening the resin to form a resin layer on the surface of the substrate;
   wherein the ratio of the total weight of the resin and curing agent to the weight of the solvent is 1:2 to 1:6.

7. The method for coating boron according to claim 6, wherein, in the solute, the weight ratio of the curing agent to the resin is 1:3 to 1:5.

8. The method for coating boron according to claim 4, wherein in the step 1), the boron-containing resin solution is applied on the surface of the substrate by the means of brush coating, spray coating or dipping coating.

9. The method for coating boron according to claim 4, wherein in the step 2), a method of removing the solvent is to evaporate the solvent in the boron-containing resin solution by the means of baking.

10. A method for making a boron-coated thermal neutron converter, comprising the following steps:
   1) preparing a substrate:
   2) adhering a boron-containing coating layer on an internal surface and/or an external surface of the substrate using the method for coating boron according to claim 4.

11. The boron-containing resin solution according to claim 1, wherein the boron powder is a nanometer-sized boron powder.

12. The boron-containing resin solution according to claim 1, wherein the resin is an epoxy resin having a molecular weight from 200 to 500.

13. The boron-containing resin solution according to claim 12, wherein the resin selected from the group consisting of: bisphenol A epoxy resin, bisphenol F epoxy resin, novolac epoxy type resin vinyl ester resin and combinations thereof.

14. The boron-containing resin solution according to claim 1, wherein the curing agent is selected from the group consisting of: ethylenediamine, triethylamine, diethylenetriamine, triethylenetetramine, N,N-dimethylaminopropylamine, N,N-diethylaminopropylamine, xylenediamine, m-phenylenediamine and combinations thereof.

15. The boron-containing resin solution according to claim 1, wherein the solvent is a solvent having boiling point between 100° C. and 200° C.

16. The boron-containing resin solution according to claim 15, wherein the solvent is selected from the group consisting of: butyl glycidyl ether, benzyl glycidyl ether, phenyl glycidyl ether, ethylene glycol diglycidyl ether, alkylene glycidyl ether and combinations thereof.

17. The boron-containing resin solution according to claim 1, wherein the resin is a bisphenol A epoxy resin, the curing agent is triethylenetetramine, and the solvent is butyl glycidyl ether.

18. The method for coating boron according to claim 4, wherein the substrate is a metallic substrate or a non-metallic insulating substrate.

19. The method for coating boron according to claim 18, wherein the substrate is a substrate of aluminum, copper or Aramid paper.

* * * * *